June 21, 1927.
H. WITTEMEIER
FILTER FOR PURIFYING THE AIR
Original Filed Jan. 5, 1921
1,632,813
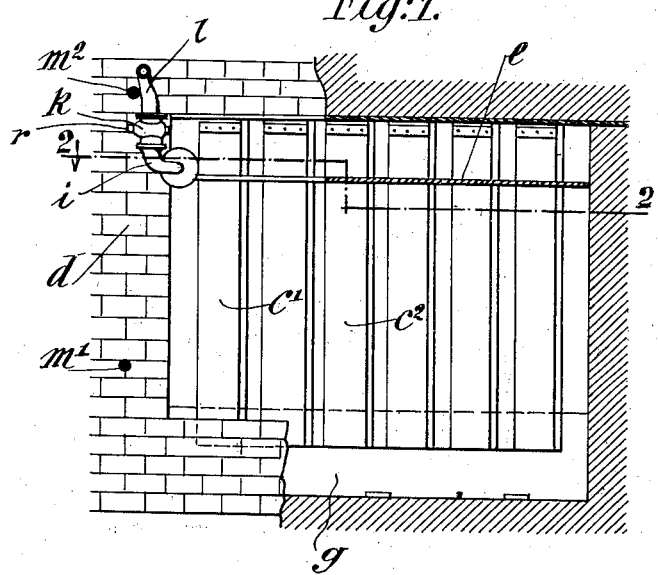
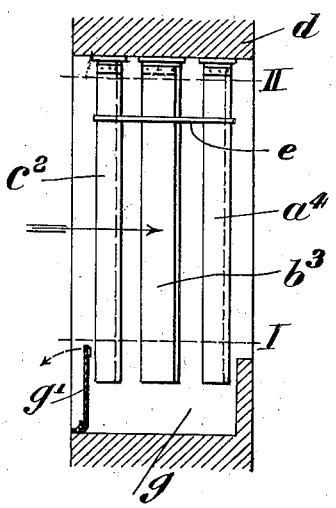
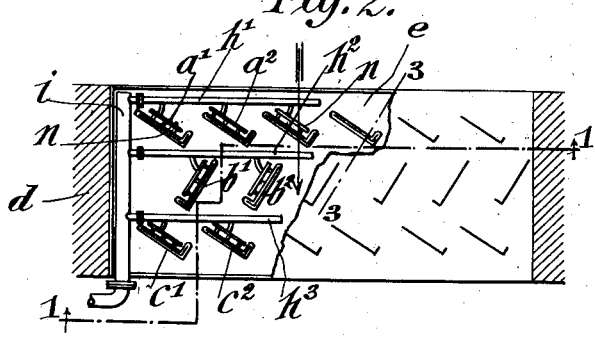
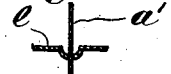
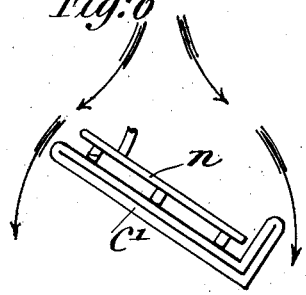
INVENTOR
Hans Wittemeier
BY C. P. Goepel.
ATTORNEY Patented June 21, 1927.

1,632,813

UNITED STATES PATENT OFFICE.

HANS WITTEMEIER, OF BERLIN, GERMANY.

FILTER FOR PURIFYING THE AIR.

Original application filed January 5, 1921, Serial No. 435,288, and in Great Britain July 28, 1915. Divided and this application filed March 15, 1924. Serial No. 699,600.

In many technical processes and plants the purification of the air plays an important part. In heating and ventilating plants the cleaning of the air is necessary for hygienic reasons; in turbo-generators, compressors and the like the air must be deprived of dust in order to secure reliability of operation which would be impaired by dirt that would rapidly collect in sensitive parts of the machines.

The only materials that were used hitherto for filtering purposes were substances whose structure or texture were such as to present the largest possible surface, combined with a small resistance, to the air passing through them. Such substances are, for example, porous and granulated bodies, fibrous and textile materials, and, in a small measure, finely distributed liquids.

Hitherto the preference has generally been given to fibrous stuffs in the form of filtering cloths. But these still have two serious drawbacks. In the first place, the clogging up of the cloth by the dust results in a rapid increase of the resistance offered to the air passing through it; and secondly, even if they are impregnated with a non-combustible agent they are not sufficiently proof against fires, which are liable to occur, especially in electric generators. This drawback had to be met by providing special fire-preventing flaps.

These drawbacks are obviated by making the filtering members of layers of non-combustible bodies of any geometrical shape such as balls, cylindrical or prismatic rods of glass, porcelain, etc., which, in order to increase their adhesiveness, are coated by a non-evaporating liquid such as glycerine or the like.

The advantages offered by the new invention are as follows: The proneness of the filter to become rapidly clogged with impurities is removed, because the dirt-removing operation principally consists in repeatedly deflecting the innumerable air jets into which the whole air current is divided. The arrangement of the filter may be such that the untreated air first encounters a layer of comparatively large balls and then passes through additional layers of finer balls.

Another advantage is that the casing of the filter may be made of any space-saving shape such as rectangular, round, etc., whilst it is known that cloth filters are limited to rectangular shapes for technological reasons.

Special mention must be made of the extraordinarily convenient manner in which the various elements of the filter may be cleaned whilst the plant is in operation. The filter balls are simply taken out at the foot of each element of the filter, and then washed and replaced through the top. Thus a simple mechanical cleaning process is employed and the soiled filter material is always re-used after cleaning, whilst the so-called filter cloths had to be cleaned from time to time by a chemical process and were worn out very much faster. The cells may be taken out and cleaned without taking out separately the filtering material.

This application is a divisional application of my U. S. Patent No. 1,521,575 granted December 30, 1924, and the present invention relates specifically to a specific embodiment of the invention set forth in the foregoing patent.

The invention is illustrated in the accompanying drawings in which—

Fig. 1 is a front view partly in section, on line 1—1 of Fig. 2;

Fig. 2 is a horizontal section taken on line 2—2 of Fig. 1, with the right hand portion shown diagrammatically.

Fig. 3 is a vertical section on line 3—3 of Fig. 2, of special form according to the invention some of the parts to the rear being omitted.

Figs. 4 and 5 show different arrangements for cleaning the filter bars of Figs. 1 and 2.

Fig. 6 is a separate view of one of the bars showing the action of the air in respect thereto.

Similar characters of reference indicate corresponding parts throughout the various views.

The dust-retaining bodies that are moistened with dust-retaining substance may also take the form of grating bars. An arrangement of this kind is shown in Figs. 1 and 5. To prevent dust from accumulating on the bars they are scraped clean from time to time by special dust scrapers that are moved along the bars. A separate scraper may be provided from each bar, and each scraper may be arranged to be moved up and down by itself. But the arrangement may also be such that all the scrapers are connected to a common driving device by which they are moved up and down together. Another arrangement consists in providing a common sheet metal scraper composed of a sheet with slits through which the filter bars pass. To clean the bars the sheet metal scraper is simply moved up and down.

When the bars have been scraped clean, they must be provided with a fresh coating of dust-retaining agent. This is accomplished in accordance with the invention by attaching moistening devices to the scrapers by means of which the dust-retaining agent such as a suitable viscous coating, as glycerine, is conducted to the various filter bars.

The moistening devices move up and down with the scrapers. When these latter are in their bottom position, the tap or taps of the moistening devices are opened so that the dust-retaining agent is imparted to the filter bars during the upward motion of the scrapers and when these scrapers reach their top position the said taps are closed again. Means may be provided by which the opening and closing of the taps is done automatically, and this means may consist of cams of the kind used on machine tools, such as a vertical planer in which the work reciprocates.

The vertical bars $a^1$, $a^2$ ... $b^1$, $b^2$ ... $c^1$, $c^2$ are arranged in an opening in the brick wall $d$, the bars being placed in several rows one behind the other and all passing through a metal sheet $e$ that is arranged to move up and down in the said opening and serves as a scraper. To maintain a good scraping effect, downwardly extending projections may be stamped out of the sheet as indicated in Fig. 4, or movable flaps $f$ may be arranged at the underside of the scraper sheet as shown in Fig. 5; springs (not shown) being provided that press the flaps against the filter bars.

The filter bars are fixed at one end, namely their upper ends only, their lower ends being suspended in the air, so that the bars will yield and no jamming of the plate $e$ will occur when it is moved up and down.

The filter bars are all of angular cross section, so that when the air passes through in the direction indicated by the feathered arrow, eddies are formed, which favor the depositing of the impurities of the air on the filter bars, and especially the coarser dust. One skilled in the art will recognize that this type of filter is intended for coarser dust.

Beneath the filter bars a special pit $g$ is formed in the brick or stone wall, this pit being adapted to receive the dust scraped off the bars. The dust heap can be readily shoveled out of the pit when the door or flap $g^1$ is turned down in the direction indicated by the arrow. At the upper side of the scraper sheet there is a system of pipes $h^1$, $h^2$, $h^3$ (Fig. 2) running in the direction of the length of the filter and fed from a common pipe $i$ which is connected through a cock or valve $k$ and a flexible hose $l$ to a tank (not shown) that contains the dust-retaining agent. The valve $k$, through which the dust-retaining agent (such as glycerine) flows from the tank into the pipes $h$, is opened when the scraper sheet $e$ is in its lowest position I, Fig. 3, but is closed when it reaches its highest position II, Fig. 3. The said valve or cock is controlled by cams arranged on the wall at the points $m^1$, $m^2$ indicated in Fig. 1. In Fig. 1 cams $m^1$ and $m^2$ are shown projecting from wall $d$ in such a manner as to engage a handle $r$ on valve $k$. When the scraper is in its lowest position I cams $m^1$ engage handle $r$ so as to open valve $k$ and when it is raised to the upper position II the valve is rocked downwardly by cam $m^2$ and again closed until the scraping operation is repeated. From the distributing pipes $h$ branch pipes $n$ (Fig. 2) lead to the individual filtering bars.

The reciprocating vertical motion of the scraper sheet $e$ and the system of pipes attached thereto may be arranged to be carried out continuously, or at certain intervals as required. Any suitable kind of drive may be employed; for illustrative purposes the handle $j$ is shown which is lowered and raised to perform the scraping operation on the filter bars.

From the foregoing it will be seen that scrapers are provided in connection with the filtering bars of suitable shape, but it is clear that such scrapers may be provided with any form of bar, it being only then necessary to rearrange the scrapers in accordance with the configuration of said bars, the scrapers being provided on any concave portion of filter bars. It will be noted that the filtering bars are arranged substantially in one direction, with the same sides of all the bars windward. The scrapers serve to scrape off the dust that has accumulated and at the same time serve to equalize the viscous coating applied to the bars. The scrapers may be operated automatically or by hand. Instead of providing all of the bars with scrapers, several of the same may be provided and the scrapers may be made interchangeable to all the bars. The scrapers may be operated during the air flow passing through the filter or when the air flow has been stopped the scrapers may be operated for the purpose of cleaning only.

I claim:

1. A filter comprising a filter bar and means for scraping the same.

2. A filter comprising a filter bar hollowed on one side and means in the hollow side thereof for scraping the collected dust therefrom.

3. A filter comprising a bar having a viscous coating and scraper therefor for removing the accumulated dust and equalizing the coating on the concave side of the filter bar.

4. A filter comprising a bar, a scraper thereon for simultaneously removing the dust and supplying a viscous coating to the filter.

5. A filter comprising a filter bar and means for supplying the filter bar with a viscous coating, and means for moving said coating means along the filter bar.

6. A filter comprising a plurality of filter bars held at one end, and a scraper for scraping all of said bars simultaneously.

7. A filter comprising a plurality of filter bars held at one end, a scraper for scraping all of said bars simultaneously, and means for providing the bars with a viscous coating simultaneously therewith.

In testimony that I claim the foregoing as my invention, I have signed my name hereto.

HANS WITTEMEIER.